United States Patent
Kari et al.

(10) Patent No.: US 12,385,752 B2
(45) Date of Patent: Aug. 12, 2025

(54) COMPUTER-IMPLEMENTED METHOD FOR DETERMINING A NAVIGATION ROUTE

(71) Applicant: Dr. Ing. h.c. F. Porsche Aktiengesellschaft, Stuttgart (DE)

(72) Inventors: Mohamed Kari, Essen (DE); Luis Falconeri Sousa Pinto Coelho, Berlin (DE); Philipp Hallgarten, Weil der Stadt (DE); David Bethge, Stuttgart-Feuerbach (DE); Tobias Grosse-Puppendahl, Stuttgart-Feuerbach (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 395 days.

(21) Appl. No.: 17/973,063

(22) Filed: Oct. 25, 2022

(65) Prior Publication Data
US 2024/0027215 A1     Jan. 25, 2024

(30) Foreign Application Priority Data
Jul. 21, 2022 (DE) ..................... 10 2022 118 329.7

(51) Int. Cl.
*G01C 21/34* (2006.01)
(52) U.S. Cl.
CPC ..... *G01C 21/3484* (2013.01); *G01C 21/3446* (2013.01); *G01C 21/3492* (2013.01)
(58) Field of Classification Search
None
See application file for complete search history.

(56) References Cited

U.S. PATENT DOCUMENTS

| | | |
|---|---|---|
| 11,255,685 B2 | 2/2022 | Figueredo de Santana et al. |
| 2017/0030726 A1* | 2/2017 | French .............. G01C 21/3697 |

(Continued)

FOREIGN PATENT DOCUMENTS

| | | | |
|---|---|---|---|
| DE | 102011083370 | 3/2013 | |
| WO | WO-2016097515 A1 * | 6/2016 | ......... G01C 21/3461 |

OTHER PUBLICATIONS

WO-2016097515-A1 English translation of written description, retrieved from Espacenet on Jan. 16, 2025 (Year: 2025).*

(Continued)

*Primary Examiner* — Amelia Vorce
(74) *Attorney, Agent, or Firm* — Gerald E. Hespos; Michael J Porco

(57) ABSTRACT

A computer-implemented method is provided for determining a navigation route between a start point and a target point. The method includes setting the start and target points, and then generating a road map with a road graph having plural edges between the star and target points representing traversable route portions. The generated road map also has nodes that interconnect the adjacent edges. The road map is generated from geospatial data retrievably stored in a database. The method proceeds by generating an emotion map layer by a machine learning model that is trained to predict, based on static and/or dynamic contextual input data for each of the edges, the likely emotions of a driver as they traverse the relevant edge and generate emotion weightings in the emotion map layer. The method then calculates the navigation route by the emotion map layer with the emotion weightings obtained in the previous step.

13 Claims, 2 Drawing Sheets

(56) References Cited

U.S. PATENT DOCUMENTS

| | | | | |
|---|---|---|---|---|
| 2018/0129879 | A1* | 5/2018 | Achtelik | G01C 5/00 |
| 2018/0182381 | A1* | 6/2018 | Singh | G06F 16/9537 |
| 2019/0232974 | A1* | 8/2019 | Reiley | G06V 40/168 |
| 2019/0325747 | A1* | 10/2019 | Fleming | G01C 21/3484 |
| 2019/0376808 | A1* | 12/2019 | Shikanai | G01C 21/3484 |
| 2019/0377961 | A1* | 12/2019 | Inai | G07C 5/008 |
| 2020/0279097 | A1* | 9/2020 | Bessenecker | G09B 29/106 |
| 2020/0408546 | A1* | 12/2020 | Vaughn | G01C 21/3423 |
| 2021/0253128 | A1* | 8/2021 | Nister | G06N 7/01 |
| 2021/0293571 | A1* | 9/2021 | Nakanishi | G01C 21/28 |
| 2021/0331670 | A1* | 10/2021 | Valchok | G01C 21/3658 |
| 2022/0011118 | A1* | 1/2022 | Beggel | G06N 7/01 |
| 2022/0065644 | A1* | 3/2022 | Kundu | G01C 21/3446 |
| 2023/0048365 | A1* | 2/2023 | Saxena | G06V 20/56 |
| 2023/0128788 | A1* | 4/2023 | Millington | G01C 21/3605 |
| | | | | 701/533 |
| 2023/0274197 | A1* | 8/2023 | Zhao | G16Y 10/35 |
| | | | | 382/100 |
| 2023/0324187 | A1* | 10/2023 | Wang | G06Q 10/047 |
| | | | | 701/410 |
| 2023/0341234 | A1* | 10/2023 | Nister | B60W 60/001 |
| 2024/0335738 | A1* | 10/2024 | Lake-Schaal | A63F 13/803 |
| 2024/0428697 | A1* | 12/2024 | Chambers | G05D 1/1064 |

OTHER PUBLICATIONS

Helle, Joose & Poom, Age & Willberg, Elias S & Toivonen, Tuuli, 2021. "The Green Paths route planning software for exposure-optimised travel", OSF Preprints vxcp3, Center for Open Science.
German Examination Report dated Feb. 28, 2023.

* cited by examiner

COMPUTER-IMPLEMENTED METHOD FOR DETERMINING A NAVIGATION ROUTE

CROSS-REFERENCE TO RELATED APPLICATION

This application claims priority on German Patent Application No 10 2022 118 329.7 filed Jul. 21, 2022, the entire disclosure of which is incorporated herein by reference.

BACKGROUND

Field of the Invention This disclosure relates to a computer-implemented method for determining a navigation route between a start point and a target point.

Related Art Methods are known for calculating a navigation route between a start point and a target point. The start point and the current position of the user are captured by a global navigation satellite system for positioning, in particular by means of a global positioning system (GPS). The input of the target point and optionally also the input of intermediate targets is performed by text input and/or by voice recognition. A navigation route then is calculated from the coordinates of the start point and the target point and may take into account one or more intermediate targets. The navigation route is displayed to a user by a display apparatus, for example on a display screen of a mobile or vehicle-integrated navigation device, or on a display apparatus of a tablet PC or smartphone. Some methods give the user driving instructions, such as turning instructions, by voice outputs during the journey.

The navigation system often permits the user to select between different route options. For example, the user can choose to reach the destination on the fastest route, the shortest route, or a consumption-optimized route.

Individual route portions along the route between the start point and the target point can trigger positive, negative, or neutral emotions for a user, and these user emotions typically have been disregarded in route planning.

Approaches for determining navigation routes that take emotions as well as stress situations into account are known. For example, U.S. Pat. No. 11,255,685 discloses a method for determining a navigation route that takes into account the emotions of a driver of the motor vehicle as determined by sensors in the vehicle for sensing user data, such as: health data; physiological data, such as heart rate, sweat, tension, body temperature; and physical user-status data, such as facial expression, voice levels and body movements. In doing so, the route is determined based on previous events stored in a database that are stress-generating for the driver on different roads. The health data, physiological data and physical user-status data are used in a stress predictor model and in a route determination model The problem addressed by the invention is to provide a further improved computer-implemented method for determining a navigation route between a start point and a target point. The method reliably guides a user through real traffic and produces emotions that are as positive as possible.

SUMMARY

A method is provided for determining a navigation route between a start point and a target point. The method in accordance with some embodiments comprises setting the start point and the target point. The method proceeds by generating a road map with a road graph comprising edges between the start point and the target point. The road graph represents traversable route portions, and nodes that interconnect the adjacent edges. The road map is generated from geospatial data retrievably stored in a database. The method further includes generating an emotion map layer by means of a machine learning model that is trained to predict, based on static and/or dynamic contextual input data for each of the edges, the likely emotions of a driver as the relevant edges are traversed and generates emotion weightings in the emotion map layer. The method continues by calculating the navigation route by means of the emotion map layer with the emotion weightings obtained in the previous step.

The method allows the route planning of a navigation system to be optimized such that the navigation route between the start point and the target point induces emotions that are as positive as possible for a user and, in this respect, is emotion-optimized. An adjusted emotion map layer generated by the machine learning model is used to determine the navigation route. This machine learning model is trained to predict a user's emotion along a route based on static and/or dynamic contextual data. The machine learning model of some embodiments is trained through supervised learning prior to use in productive operation.

The navigation route can be calculated by a graph-based algorithm, such as a Dijkstra algorithm or an A* algorithm, or by a contraction hierarchy algorithm configured to optimize the navigation route.

Traffic data, preferably real-time traffic data, road characteristic data, and weather data, can be used as the contextual input data.

Metrics of the surrounding environment may be interpolated and used as the input data. In one embodiment, a green index is calculated by an evaluation of satellite images and forms a possible metric of the surrounding environment.

In one embodiment, the navigation route is calculated to achieve a number of optimization targets. Different optimization targets can be used. In this context, this includes among other things environmental optimization targets, such as the shortest distance between the start point and the target point, which does not change during the duration of the journey. Contextual characteristics of the environment, such as the number of lanes and speed limits, may be incorporated into the optimization to derive resulting emotions. Further, time-dependent optimization targets that change during the duration of the journey can be used, such as the shortest travel time between the start point and the target point, and these time-dependent optimization targets can vary continuously due to the current traffic situation. The travel time is used as the primary optimization target. Further, user-dependent optimization targets can also be used. These depend on very different personal criteria. The user-dependent optimization targets may scale over a variety of users, including unknown users. Generally, condition-dependent optimization targets can also be used to account for the state of an object, such as the state of charge of an electric vehicle.

A one-step optimization method can be used to optimize the navigation route and achieve the optimization targets, because each road segment can be associated with the expected emotions as one traverses that road segment, which is represented by an edge. The primary optimization target is travel time, and in one embodiment the emotion weightings are added to the weightings of the edges of the road graph as malus factors ("penalty factors"). The machine learning model calculates the malus factors and takes into account various emotion-related features.

The most challenging optimization targets require an approach to express their influence on the weightings of a graph. The most common form is modeling based on historical observations, such as travel times or the lowest particulate matter capture. However, these two examples differ greatly in how they can be applied to a graph network. In the case of travel times, the observations can be linked directly to the edges of the road graph. For particulate matter, an intermediate step in the interpolation and the edge linking is required, because the observations are linked to measurement stations. The characteristics of the route portions can be used as direct input parameters.

Optimization models that take travel time into account require a time-based modeling, because traffic occurrence and thus the weightings in the road graphs change over the duration of the journey. Such predictive models often are based on historical observations. Other than the travel time, the method presented herein preferably does not take into account any additional, rapidly changing environmental parameters. For example, the weather may be considered static throughout the journey. This can advantageously reduce the computational effort.

In many applications, such as predicting travel time, the malus factor can be determined for each portion of the route—that is, each edge of the road graph—by a regression model. In one embodiment, a multi-class model is used to predict emotions (for example, "positive," "neutral," "negative") and calculate the malus factors. The input parameters of the multi-class model may comprise road parameters and the output parameters may calculate pseudo-probabilities for each of the classes of the multi-class model. To synthesize the malus factor for the graph edges, there is in one embodiment the possibility of only using the pseudo-probability of the class "positive." Alternative methods include depicting the model as a binary classifier (e.g. "positive" vs. all other classes), which however comes at the price of decreased performance due to greater class imbalance.

DETAILED DESCRIPTION

Figure 1:
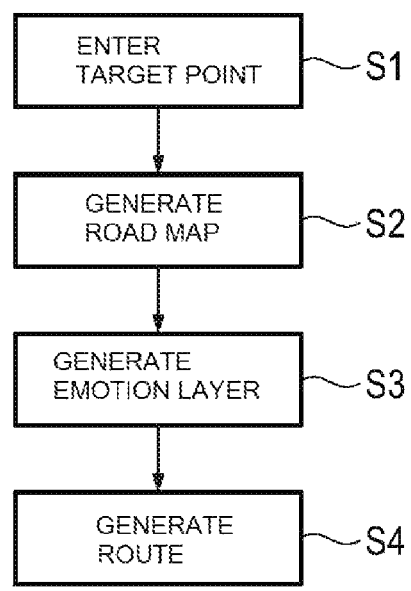
FIG. 1 schematically illustrates a basic workflow of a computer-implemented method for determining a navigation route between a start point and a target point and method steps to provide a user with an emotion-optimized route between the starting point and the target point.

At the outset, it should be understood that should be understood that the elements and functions described herein and shown in FIG. 1 may be implemented in various forms of hardware, software or combinations thereof. These elements may be implemented in a combination of hardware and software on one or more appropriately programmed general-purpose devices, which may include a processor, memory and input/output interfaces. The term "coupled" as used or implied herein mean directly connected to or indirectly connected with through one or more intermediate components. Such intermediate components may include both hardware and software-based components.

Those skilled in the art will appreciate that the blocks shown in the flow chart of FIG. 1 represent conceptual views of illustrative circuitry embodying the principles of the disclosure and/or also represent various processes that may be represented substantially in computer readable media and so executed by a computer or processor, whether or not such computer or processor is explicitly shown.

The functions illustrated schematically in the flow chart of FIG. 1 may be carried out with a control unit that may be provided through the use of dedicated hardware as well as hardware capable of executing software in association with appropriate software. In one embodiment, some or all of the functions may be performed by at least one processor, such as a computer or an electronic data processor, digital signal processor or embedded micro-controller, in accordance with code, such as computer program code, software, and/or integrated circuits that are coded to perform such functions, unless indicated otherwise. When provided by a processor, the functions may be provided by a single dedicated processor, by a single shared processor, or by a plurality of individual processors, some of which may be shared. Moreover, the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage. Other hardware, conventional and/or custom, may also be included in the control unit, such as a memory, input/output interfaces, a wireless transceiver, analog-to-digital converters, etc.

Locating an emotion-optimized navigation route is complex for several reasons. The optimization of the navigation route must be performed in near real time, and all information required for the calculation algorithm must be available.

Proceeding from a starting point "a" and a selected target point "b" as GPS coordinates, the method described below searches for a route that will most likely make the user happy from an emotional point of view. The input of additional intermediate targets is also possible.

The following requirements should ideally be met by the calculation algorithm:
a) The emotional component of the route is context-dependent and thus depends on known or likely personal data, traffic, and environmental characteristics.
b) The happiness weighting of individual road segments must be assigned prior to the start of navigation.
c) The system preferably should be operable like an ordinary smartphone navigation system, enabling a search for a destination (e.g. the search for a train station), relocating based on the geolocation of the smartphone, and displaying the progress of the calculated, emotion-optimized navigation route. The system also should provide driving instructions, such as turning instructions, to the driver in real time.
c) The navigation engine should be run as a scalable system and provide emotion-optimized navigation routes in each geolocation (no pre-calculated or historical routes). Further, optimizations of the route paths should be provided without delay. Thus, in some embodiments, the user receives the route recommendation in less than 2 seconds after the target input.

In a first step S1, the target point is entered, and the current position of the user, representing the start point, is detected and thereby set. The input of the target point can occur by text input or by voice input. The start point preferably is captured by GPS.

Figure 2:
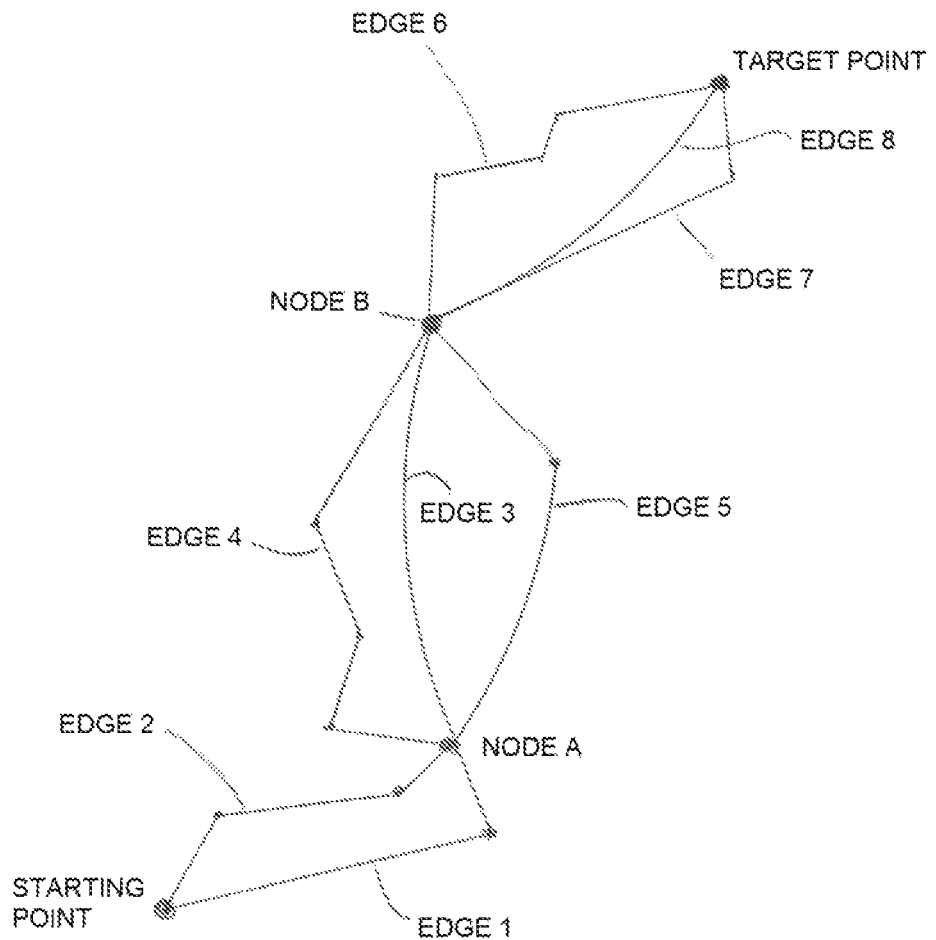
FIG. 2 schematically illustrates optional travel routes and route segments or edges between a start point and a target

After entering the start point and the target point in step S1, the method proceeds with a step S2 by generating a road map with a road graph that comprises edges between the starting point and the target, as illustrated schematically in FIG. 2. The road graph represents traversable path portions or edges and nodes interconnecting adjacent edges. This road map is generated from geodata retrievably stored in a database.

A subsequent step S3 uses a machine learning model to generate a user-defined emotion map layer. The machine learning model is trained to predict likely emotions of a driver as he or she traverses the relevant edge representing a traversable route portion. These predictions are based on static and/or dynamic contextual input data for each of the edges. The machine learning model generates emotion weightings in the emotion map layer. Thus, a user-defined emotion map layer is calculated in that emotion weightings for each of the edges in the road graph are predicted by means of the machine learning model.

Step S4 calculates the navigation route by means of the emotion map layer containing the emotion weightings obtained in the previous step S3. The calculation of the emotion-optimized route is carried out by an optimization method and, in some embodiments is carried out in a single step by means of the newly created map plane that is formed by the emotion map layer.

The basis for the emotion-optimized route calculation is a computer-assisted behavior model for predicting emotions based on the road context, thereby allowing the learning of subject-independent emotion markings for previously unknown route portions.

The contextual input data can include at least the following data:
  weather data, in particular the outside temperature, the wind speed, or the degree of clouding,
  traffic data, preferably real-time traffic data,
  road characteristic data, such as the type of road, the maximum allowable speed, or the number of lanes,
  a green index in an environmental context,
  the time of day, and
  personal data such as the age and the subjectively perceived mood of the user. Some embodiments of the method use only contextual input data that can be calculated prior to commencement of the journey. The green index quantifies the vegetation at a particular location based on satellite images. Satellite images may be retrieved and evaluated to determine this green index. For example, the green index can be indicated as a percentage of green pixels in a selected area of the satellite image.

Contextual input data may vary in a time-dependent manner or in a seasonal manner. For example, a route with colorful autumn foliage could be given a very positive emotional contextual input if the route is being traveled during a day in October, but much less so if the route (edge) is being traveled in February or at night. Similarly, a route (edge) that is being driven at night might have a positive emotional contextual input on a clear night when there is a full moon, but much less so during daylight hours, on a cloudy night or when there is no moon. To the opposite extreme, a route segment (edge) that is being traveled when a setting sun would shine directly in the eyes of a driver might have a very negative emotional contextual input in late afternoon, but much less so in late morning. Thus, the method presented herein creates a user-defined emotion map layer that contains predicted emotions in the form of emotion weightings calculated by means of the machine learning model before optimizing the navigation route based on defined optimization targets.

Proceeding from a road graph (e.g. FIG. 2) having a plurality of nodes and a plurality of edges (E), emotion weightings are predicted for each traversable road segment (each edge) by means of the trained machine learning model. To optimize the navigation route, some embodiments apply an algorithm of the contraction hierarchies to the road graph.

More particularly, the following equation is implemented with the start point "a" and the target point "b":

$$\text{Route}(a, b) = m\text{"in} \sum_{i,j \in [a,b], i \neq j \in E} \frac{d(i, j)}{\lambda * e(i, j) * c(e(i, j))}$$

By contrast to the fastest route, the optimization algorithm minimizes the sum of the travel time of each edge d(i,j) and penalizes its decision with the happiness weighting factor $\lambda$ multiplied by the correspondingly predicted happiness value e (i,j), multiplied by the confidence in the individual happiness prediction c(e(i,j)). The terms of the denominator thus represent a malus factor. The term of the denominator ensures that it is advantageous for the optimization algorithm to select edges with high predicted happiness values. A simulation study found that a happiness weighting factor of $\lambda=20$ provides a good compromise between travel time and positive emotions.

The smartphone navigation app, by means of which the method presented herein is implemented, tracks the current position of the smartphone by means of GPS and then performs a map alignment between the current geocoordinates and the associated route portion and outputs navigation instructions (via text and speech). Thus, the user can choose to calculate at least the fastest and the most emotion-optimized route.

It is to be appreciated that the various features shown and described are interchangeable, that is a feature shown or described in one embodiment may be incorporated into another embodiment. It is further to be appreciated that the methods, functions, algorithms, etc. described above may be implemented by any single device and/or combinations of devices forming a system, including but not limited to storage devices, processors, memories, FPGAs, DSPs, etc.

While non-limiting embodiments are disclosed herein, many variations are possible which remain within the concept and scope of the present disclosure. Such variations would become clear to one of ordinary skill in the art after inspection of the specification, drawings and claims herein. The present disclosure therefore is not to be restricted except within the spirit and scope of the appended claims.

Furthermore, although the foregoing text sets forth a detailed description of numerous embodiments, it should be understood that the legal scope of the present disclosure is defined by the words of the claims set forth below. The detailed description is to be construed as exemplary only and does not describe every possible embodiment, as describing every possible embodiment would be impractical, if not impossible. One could implement numerous alternate embodiments, using either current technology or technology developed after the filing date of this document, which would still fall within the scope of the claims.

The invention claimed is:

1. A computer-implemented method for determining a navigation route between a start point and a target point, comprising the following steps:
  setting the start point and the target point,
  generating a road map with a road graph comprising a plurality of edges and nodes between the start point and the target point, with the edges representing traversable route portions, and the nodes interconnecting the edges that are adjacent to one another, wherein the road map is generated from geospatial data retrievably stored in a database;

using a machine learning model that is trained to employ static and/or dynamic contextual input data for each of the edges to predict likely emotions of a driver as the driver traverses the edges, using the predicted likely emotions to generate emotion weightings for each of the plurality of edges and then using the emotion weightings to generate an emotion map layer; and calculating the navigation route by means of the emotion map layer generated with the emotion weightings such that the navigation route is emotion-optimized.

2. The computer-implemented method of claim 1, wherein the navigation route is calculated by a graph-based algorithm, in particular a Dijkstra algorithm or an A* algorithm.

3. The computer-implemented method of claim 2, wherein the graph-based algorithm is a Dijkstra algorithm.

4. The computer-implemented method of claim 2, wherein the graph-based algorithm is an A* algorithm.

5. The computer-implemented method of claim 1, wherein the navigation route is calculated by a contraction hierarchy algorithm configured to optimize the navigation route, wherein the algorithm minimizes a sum of travel time of each edge and penalizes the sum with the predicted likely emotions of each edge.

6. The computer-implemented method of claim 1, wherein the contextual input data includes real-time traffic data, road characteristic data, and weather data.

7. The computer-implemented method of claim 1, further comprising observing and interpolating environmental landscape data and then using the interpolated environmental landscape data as at least one of the static and/or dynamic contextual input data.

8. The computer-implemented method of claim 7, further comprising evaluating satellite images, calculating a green index based on the evaluation of the satellite images and then using the green index as at least one of the static and/or dynamic contextual input data.

9. The computer-implemented method of claim 1, further comprising calculating the navigation route for achieving a number of optimization targets.

10. The computer-implemented method of claim 9, wherein the emotion weightings if each edge of the plurality of edges is used to optimize the navigation route and to achieve the optimization targets.

11. The computer-implemented method of claim 9, wherein the primary optimization target is travel time and the emotion weightings are added to weightings of the edges of the road graph as malus factors.

12. The computer-implemented method of claim 11, wherein a multi-class model is used to predict the emotions of the driver and to calculate the malus factors.

13. The computer-implemented method of claim 12, wherein the input values of the multi-class model comprise road parameters and the output values are calculated pseudo-probabilities for each of the classes of the multi-class model.

* * * * *